United States Patent

[11] 3,609,601

[72] Inventors Howard D. Phillips
Beverly Hills;
Edward M. Frymoyer, Santa Ana, both of Calif.
[21] Appl. No. 2,208
[22] Filed Jan. 12, 1970
[45] Patented Sept. 28, 1971
[73] Assignee Collins Radio Company
Dallas, Tex.

[54] MONOLITHIC FILTER HAVING "M" DERIVED CHARACTERISTICS
8 Claims, 11 Drawing Figs.

[52] U.S. Cl. ........................................................ 333/72,
333/74, 310/9.5, 333/70
[51] Int. Cl. ........................................................ H03h 9/00,
H03h 9/20, H03h 9/32
[50] Field of Search ........................................... 333/71, 72, 28; 329/140; 310/8.2, 8.6

[56] References Cited

UNITED STATES PATENTS 3,396,327 8/1968 Nakazawa .................... 333/72
3,365,679 1/1968 Matsumoto .................. 333/28
3,517,350 6/1970 Beaver ......................... 333/72
3,525,944 8/1970 Smith ........................... 329/140
3,287,669 11/1966 Poschenrieder............. 333/71

*Primary Examiner*—Herman Karl Saalbach
*Assistant Examiner*—C. Baraff
*Attorneys*—Donald W. Phillion and Henry K. Woodward

ABSTRACT: A plurality electrode pairs are formed on a monolithic crystal substrate so that the resonator formed by each electrode pair is coupled acoustically to the next successive resonator, with suitable input and output transducer means associated with the first and last resonators. Discrete capacitor means connect the first electrodes of first and second pairs of electrodes to the second electrodes of said first and second pairs of electrodes. A bridging capacitor, having an order of magnitude of said first discrete capacitor means is connected between said two first electrodes. A signal passing through this bridging capacitor is 180° out-of-phase with the signal passing through filter resonators at the upper and lower limits of the filter passband to produce attenuation poles at said upper and lower limits.

INVENTORS.
HOWARD D. PHILLIPS
EDWARD M. FRYMOYER

BY Donald W. Phillion
ATTORNEY

INVENTORS.
HOWARD D. PHILLIPS
EDWARD M. FRYMOYER

BY Donald W. Phillion
ATTORNEY

INVENTORS.
HOWARD D. PHILLIPS
EDWARD M. FRYMOYER

BY Donald W. Phillion
ATTORNEY

MONOLITHIC FILTER HAVING "M" DERIVED CHARACTERISTICS

This invention generally relates to monolithic quartz crystal filters employing a plurality of resonators, and more specifically, to a monolithic crystal filter arrangement wherein the coupling between resonators is acoustic and wherein an "M" derived-type frequency response characteristic is obtained.

The "M" derived-type filter has long been known in the prior art. In lumped constant filters, the "M" derived characteristic provides additional selectivity on either the low or the high side of the frequency response characteristic essentially by having the "M" derived section tuned to have either a zero shunt impedance or an infinite series impedance at a frequency either just above or below the upper and lower cutoff frequencies of the filter.

A relatively new type of filter is known as a monolithic crystal filter and employs a monolithic crystal with a plurality of conductive electrodes formed thereon. Coupling between said pairs of electrodes can be either acoustic or electrical or a combination of both. An input signal is supplied to one of the end pairs of electrodes, which signal is then transmitted through the various pairs of electrodes making up the filter. Appropriate transducer means is connected to the other end pair of electrodes to provide an output signal. This type filter has distinct advantages over lumped constant-type filters in that it is considerably cheaper to manufacture and provides a substantially higher degree of selectivity. However, even with the sharper selectivity obtainable with monolithic crystal-type filters, the general characteristic of flared skirts common to most filters is also present in the monolithic-type filter.

It is a primary object of the invention to provide an "M" derived-type mechanical filter employing a monolithic crystal substrate with a plurality of resonators formed thereon.

A second object of the invention is a monolithic crystal filter having a plurality of acoustically coupled pairs of electrodes formed thereon and external means for bridging across one or more said pairs of electrodes to effect a substantially complete cancellation of the energy through said filter at a given frequency.

A third object of the invention is an inexpensive and reliable "M" derived-type mechanical filter employing a monolithic crystal substrate with a plurality of resonators formed thereon.

A fourth aim of the invention is an "M" derived-type monolithic crystal filter employing external capacitive bridging means for transferring energy in parallel with the energy flowing through the monolithic crystal and 180° out of phase therewith to provide cancellation therebetween and to create an attenuation pole.

A fifth object of the invention is the improvement of monolithic filters generally.

In accordance with the invention, there is provided a plurality of pairs of electrodes which are formed on a monolithic crystal substrate so that the resonator formed by each pair of electrodes is acoustically coupled to the next succeeding resonator, with suitable input and output means provided to supply and extract the input and output signals. Discrete capacitive means are provided to separately connect a first electrode of a first pair of electrodes and the first electrode of a second pair of electrodes to a reference potential. A discrete bridging capacitor, having an order of magnitude similar to said first discrete capacitive means, is connected between said two first electrodes. The signal passing through this bridging capacitor is 180° out of phase with the signal passing through said plurality of pairs of electrodes at frequencies in ranges at the upper and lower limits of the filter passband, to produce attenuation poles at said upper and lower limits.

In accordance with a feature of the invention, such attenuation poles can be caused to occur only at the upper end of the passband, or at both the upper and the lower ends of the passband, depending on how many pairs of electrodes said bridging capacitor is caused to bridge.

The above and other mentioned objects and features of the invention will be more fully understood from the following detailed description thereof when read in conjunction with the drawings in which.

Figure 1:
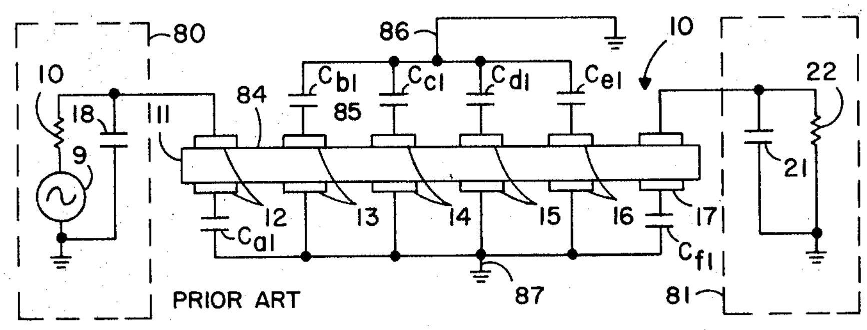
FIG. 1 is a combination schematic and plan view of a monolithic crystal filter having six pairs of electrodes formed thereon.
Figure 2:
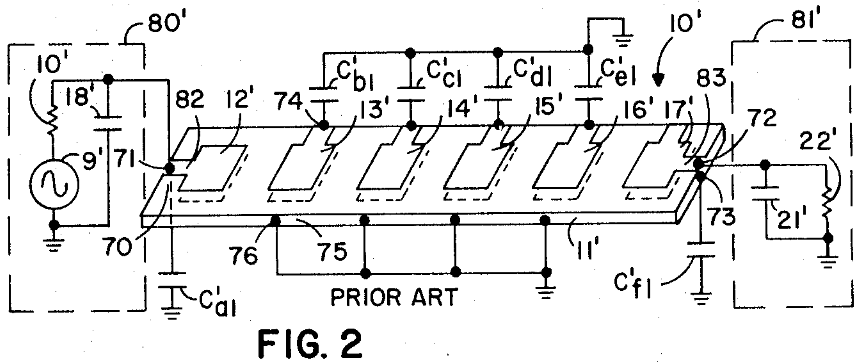
FIG. 2 is another view of the structure of FIG. 1, but with the monolithic crystal shown in perspective so that the formation of the electrodes thereon can be seen.
Figure 3:
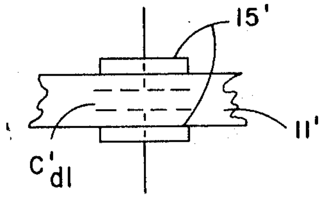
FIG. 3 is a detailed drawing showing one pair of electrodes formed on the crystal substrate and also showing the small capacitance which inherently exists in the crystal substrate between the two electrodes forming a pair of electrodes.
Figure 4:
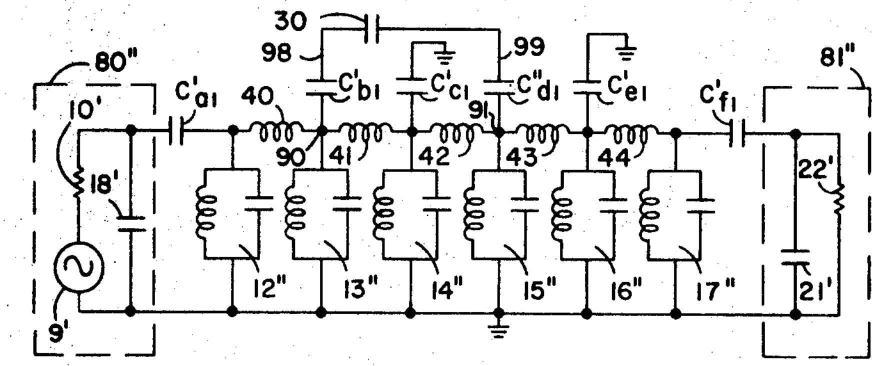
FIG. 4 is an equivalent electrical circuit of the structure of FIG. 1 illustrating the function of the small capacitors existing between the pairs of electrodes in the filter of FIG. 1, and, in addition, showing the principle of the bridging capacitor to obtain the "M" derived characteristic of the present invention.

Referring now to FIGS. 1 and 2, there are shown prior art structures. The purpose of showing such prior art structures is to provide background to facilitate an understanding of the invention. FIG. 4 is an equivalent circuit of FIG. 1 but shows, in addition, the principle of the bridging capacitor 30 to provide the "M" derived characteristic of the present invention, and consequently, forms one embodiment of the invention.

In FIG. 1, a plurality of pairs of electrodes 12 through 17 are formed on the crystal substrate 11. A clearer picture of the positioning of the electrodes on the crystal substrate is shown in the perspective view of FIG. 2.

When properly excited, each pair of electrodes, in cooperation with that portion of the crystal therebetween, forms a resonator which resonates at a frequency determined by the physical parameters of the electrodes and the crystal. The principal physical parameters involved in resonant frequency determination are the thickness of the electrodes and the thickness and cut of the crystal substrate.

As each resonator resonates, a portion of its energy will be transferred acoustically to the adjacent pairs of electrodes which in turn will respond thereto to develop a resonant condition.

Energy is supplied into the filter by means of an input signal from source 80 applied across the input pair of electrodes 12. The electrodes 12, and that portion 84 of the crystal positioned therebetween, will thereupon resonate and a portion of this resonant energy will be transferred acoustically to the resonator defined by the next adjacent pair of electrodes 13, which in turn will resonate.

Next, some of the energy from the resonator defined by electrodes 13 will flow to the next resonator comprised of electrodes 14 and the crystal therebetween, through the connecting portion 85 of the crystal substrate.

In such a manner the energy is transmitted through the entire filter including the remaining resonators defined by pairs of electrodes 15 and 16 and then to the output resonator defined by electrodes 17. Output circuit 81 functions to receive said output signal.

An important characteristic of monolithic filters is the existence of an inherent capacitance between each pair of electrodes. Such capacitance is shown as $C_{d1}$ in FIG. 2 and specifically is formed between the two conductive electrode plates 15'. The value of such capacitance is determined by the usual physical parameters including electrode area, spacing between the electrodes, and the dielectric coefficient of the crystal, and is usually a very small capacitance of the order a picofarad.

In FIG. 1, these inherent capacitances are identified by reference characters $C_{a1}$, $C_{b1}$, $C_{c1}$, $C_{d1}$, $C_{e1}$, and $C_{f1}$, and are shown as being external to the associated pairs of electrodes 12 through 17 respectively. It is to be noted that all of the top plates of the pairs of electrodes 12 through 17 are grounded through a common lead 86 and all of the bottom plates of said pairs of electrodes are grounded through a lead 87. The inherent capacitors $C_{b1}$–$C_{e1}$ are shown as being connected in series with the top plates of the associated pairs of electrodes, and inherent capacitors $C_{a1}$–$C_{f1}$ are shown as being in series with the bottom plate of the associated pair of electrodes. Thus, the effect of said such grounding is to bring the inherent capacitances $C_{a1}$ through $C_{f1}$ into the circuit as functioning elements. If these upper and lower plates were not grounded or otherwise connected to some reference potential as the input output pairs of electrodes 12 and 17 are, the inherent capacitances would, in effect, be floating and would not perform any function in the circuit.

In FIG. 4 there is shown a means for utilizing such inherent capacitances to obtain attenuation poles at the upper end or the lower end of the filter passband. More specifically, in FIG. 4, the tuned circuits 12'' through 17'' represent the resonators 12 through 17 of FIG. 1, respectively, and the inductors 40, 41, 42, 43 and 44 represent the acoustic coupling between said pairs of resonators through the connecting quartz crystal. For example, the noncoated portions 84 of the crystal 11 in FIG. 1 constitute such acoustic coupling.

Input means 80'' and output means 81'' correspond to the input and output means 80 and 81 respectively of FIG. 1. More specifically, the input means comprises signal source 19, source impedance 20, and a source reactance in the form of capacitor 18'. The inherent capacitance $C'_{a1}$ of the input pair of electrodes 11 is also a part of the input circuit and is, in effect, in series therewith. With respect to the output circuit 81'', there is provided a utilization means such as resistor 22', and having a reactance such as capacitor 21' connected thereacross. Said capacitor 21' represents an inherent capacitance ordinarily found in a load. It is to be noted that both the input and output networks could be inductive in nature, and frequently would be unless capacitance were added to cause it to become capacitive. As a matter of circuit design, the reactances of the input and output circuits of a filter network, such as the one shown in FIG. 1, are deliberately made capacitive in nature, which is the reason for showing capacitors 18' and 21'.

Referring again to the equivalent circuit of FIG. 4, a discrete capacitor 30 is connected between capacitors $C'_{b1}$ and $C''_{d1}$ so as to bridge one of the tuned circuits 14''. In this manner, energy is transferred in a parallel path across a portion of the filter. When such energy is combined at point 91 with the main energy flow through the filter, cancellation of the signals occurs since the two signals are 180° out of phase, as will be explained later.

It is to be specifically noted that the inherent capacitors $C'_{b1}$ and $C''_{d1}$, between which is connected bridging capacitor 30, are not connected to ground. To do so would prevent energy flow through bridging capacitor 30. The inherent capacitors $C'_{c1}$ and $C'_{e1}$ are shown as being connected to ground, although they could be left floating, in which case they would have no effect on the circuit.

An attenuation pole will occur in the filter passband when the energy flow through the main body of the crystal becomes small enough at the upper or the lower end of the passband due to the attenuation through the crystal, so that it is equal and opposite to the energy flow through the bridging capacitor 30. It is to be noted that the attenuation of the energy through inductors 41 and 42 will be much greater at the edges of the filter passband than will be the attenuation of the energy flow through capacitor 30. Thus there will be, in fact, a frequency at which the two signal paths will conduct an equal but oppositely phased amount of energy, thus producing substantially complete cancellation of energy which is in fact an attenuation pole.

While the addition of the capacitor 30 represents an improvement in the art and is a part of the present invention, there are problems present. The principal problem present is the size of the inherent capacitors, such as capacitor $C'_{d1}$, and $C''_{d1}$. These capacitors are quite small, being of the order of a picofarad and represent an extremely high input impedance to energy flow from point 90 to point 91. However, even with such a high input impedance, the amount of energy flowing from point 90 to point 91 through the two capacitors $C'_{b1}$ and $C''_{d1}$ would be far too great to provide the attenuation pole at the proper point in the filter passband upper and lower edges. With such a large energy flow, the attenuation pole would occur too near the 3 db. cutoff point of the filter passband. Consequently a very small bridging capacitor 30 is needed in order to decrease the energy passing therethrough from point 90 to point 91 to a value which will move the attenuation pole a desired distance away from the cutoff point of the passband.

However, if capacitor 30 is made sufficiently small to decrease the energy flow thereto to such a desirable value, problems of control become fairly serious. More specifically, in dealing with capacitances as small as the picofarad, it is quite difficult to maintain good tolerances. Furthermore, with such small impedances, a slight change in input current produces quite large voltage variations across the capacitors and results in a shifting of the attenuation poles with respect to the filter passband, due to the change in energy passing through the bridging circuit.

Figure 5:
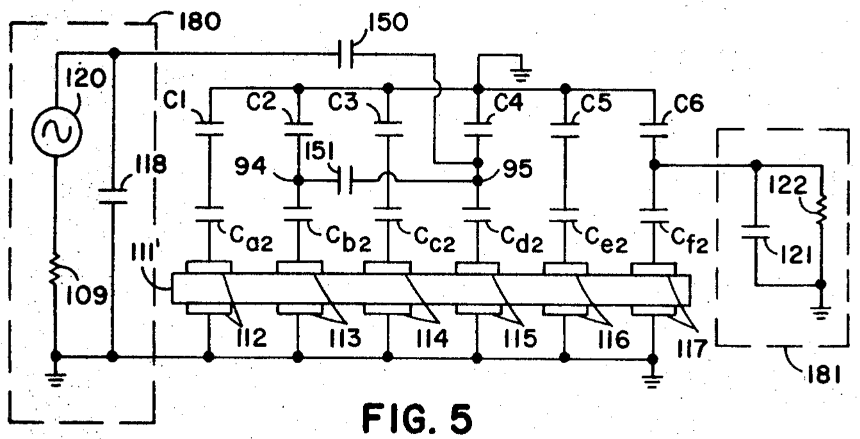
FIG. 5 is a combination schematic and plan view of a more sophisticated form of the "M" derived monolithic filter of the present invention, and has six pairs of electrodes formed thereon.

Referring now to FIG. 5, there is shown a form of the invention which overcomes the high impedance problem mentioned in the foregoing paragraph. In FIG. 5 a plurality of pairs of electrodes 112 through 117 are formed on a monolithic crystal substrate 111 in the same manner as discussed in connection with FIG. 1. The inherent capacitances between these pairs of electrodes 112 through 117 are represented by the capacitors $C_{a2}$, $C_{b2}$, $C_{c2}$, $C_{d2}$, $C_{e2}$, and $C_{f2}$. In series with each of these inherent capacitances is connected a second capacitance of the order of several hundred to several thousand picofarads. Such larger capacitances are designated by reference characters C1, C2, C3, C4, C5 and C6 and are connected respectively to the smaller inherent capacitances $C_{a2}$ through $C_{f2}$. The other plates of all the said larger capacitors C1 through C6 are connected to a common reference potential (ground) in FIG. 5 to complete the circuit to the other, lower plate of the pairs of electrodes 112 through 117. Each pair of series-connected capacitors then becomes a voltage divider with the smaller signal being across the larger capacitor. For example, the signal supplied from the pair of electrodes 114 through capacitor $C_{c2}$ and the larger capacitor C3 to ground, is divided inversely as the value of the two capacitors, with the smaller voltage appearing across the larger capacitor C2. Thus, in effect, the amount of energy available to be transferred to another point in the filter is reduced. Consequently, the bridging capacitor 151 need no longer be small in order to provide an attenuation function since signal attenuation has already been accomplished by the voltage divider comprised of capacitors $C_{b2}$ and C2. Thus bridging capacitor 151 can be large, of the order of a thousand picofarads, and in effect matched to the value of the capacitor C2 to supply the energy from the point 94 to the point 95, from which point a portion thereof will flow through the small capacitor $C_{d2}$ into the resonator defined by the pair of electrodes 115. The amount of energy thus transferred is sufficient to create an attenuation pole at the proper position in the upper or lower edge of the passband.

In the circuit of FIG. 5 the presence of capacitor C4 is not absolutely necessary. Capacitor C4 could be omitted, leaving the upper plate of capacitor $C_{d2}$ connected only to the bridging capacitor 151. The foregoing is possible since the need for a very small bridging capacitor 151 is eliminated by the presence of capacitor C2 in series with the capacitor $C_{b2}$, and not by capacitor $C_a$.

It is not necessary that the bridging capacitor bridge only a single pair of electrodes. To obtain different results, and more specifically, to obtain attenuation poles both at the top and bottom of both the upper and lower edges of the passband, a bridging capacitor which bridges two pairs of electrodes can be employed, such as bridging capacitor 150, for example. The bridging capacitor 151, which bridges only a single pair of electrodes 114, will produce an attenuation pole only at the lower edge of the passband.

The reasons why the bridging capacitor 151 produces an attenuation pole only at the lower edge of the passband, and the bridging capacitor 150 produces attenuation poles at both the lower and the upper edge of the passband, will be discussed in more detail later herein in connection with FIGS. 8, 9, 10, and 11.

Figure 6:
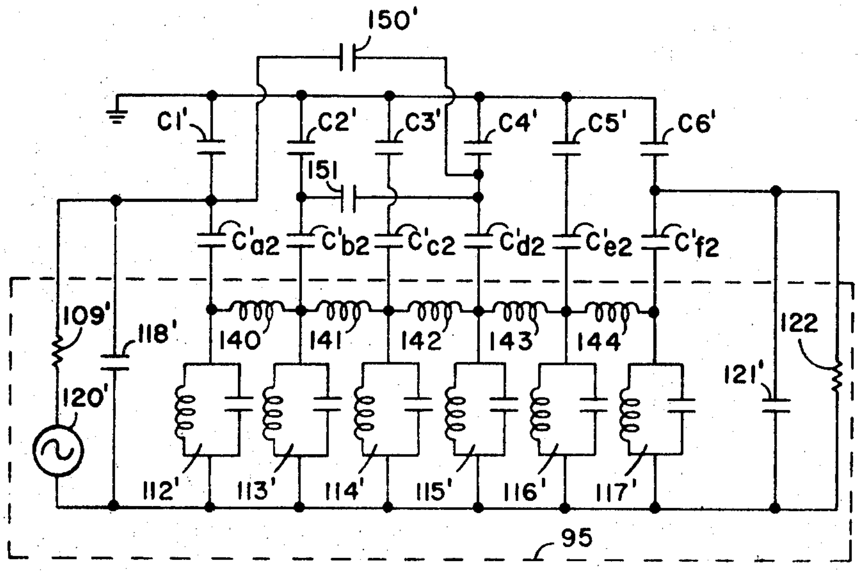
FIG. 6 is an equivalent circuit of the structure of FIG. 5.

For a further understanding of the circuit of FIG. 5, reference is now made to FIG. 6, which shows an equivalent circuit thereof. In FIG. 6, the tuned parallel circuits 112′ through 117′ represent the pairs of electrodes 112 through 117 of FIG. 5, respectively, and the inductors 140 through 144 represent the acoustical coupling between the pairs of electrodes 112 through 117 of FIG. 5, which is physically the uncoated quartz crystal therebetween, similar to connecting quartz crystal portions 84 and 85 of FIG. 1.

The capacitors C1′ through C6′ correspond to capacitors C1 through C6 of FIG. 5 and are of the order of 1,000 picofarads. Bridging capacitors 151′ and 150′ correspond to bridging capacitors 151 and 150 of FIG. 5.

Consider now the reason why a 180° change in phase shift occurs in the signal passing through the bridging capacitors with respect to the signal passing through the main body of the filter.

At the upper end of the passband, each of the tuned circuits 112′ through 117′ of FIG. 5 will be capacitive in nature since, by definition, resonance of these tuned circuits occurs within the filter passband.

Figure 8:
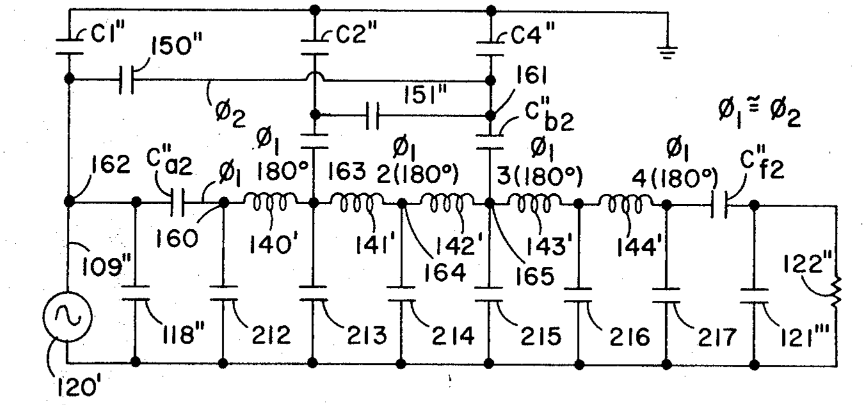
FIG. 8 shows a portion of the equivalent circuit of FIG. 6 when the frequency is near the upper end of the passband and the tuned parallel circuits of FIG. 6 become essentially capacitive in nature.

The portion of the circuit of FIG. 6 within the dotted block 95 is redrawn as FIG. 8, but with the change that the tuned circuits 112′ through 117′ have been redrawn as capacitors 212 through 217 respectively, to indicate the state of said tuned circuits near the upper edge of the passband.

In FIG. 8 the shift in signal phase from the point 162 through the input capacitor $C''_{a2}$ to point 160 is designated $\Phi_1$ and is substantially equal to the phase shift of the input signal through bridging capacitor 150″ and the much smaller capacitor $C''_{d2}$ to point 163, said latter phase shift being designated as $\Phi_2$. The foregoing is true since the reactance in both circuits is capacitive and is determined almost entirely by the small capacitors $C''_{a2}$ and $C''_{d2}$, both of which capacitors are connected substantially in series with capacitors 212 and 215, respectively.

Figure 9:
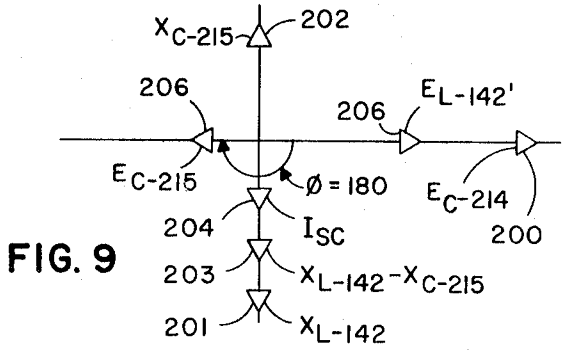
FIG. 9 is a vector diagram which illustrates the operation of FIG. 8 and shows how an attenuation pole is obtained at the upper end of the passband by bridging a certain number of pairs of electrodes, and how an attenuation pole is not formed at the upper end of the passband if other, certain number of pairs of electrodes are bridged by the bridging capacitor.

In the following paragraphs it will be shown, with the aid of the vector diagram of FIG. 9, that the phase shift of the signal passing through stages of the quartz crystal between points 160 and 163, points 163 and 164, and points 164 and 165, will in each case be 180°.

Since all of the three stages mentioned in the preceding paragraph operate in the same manner, only one will be discussed. Assume that the voltage across capacitor 214 is represented by vector 200 in FIG. 9. Further assume that the reactance of inductor 142′ in FIG. 8 is considerably larger than the reactance of capacitor 215. Such reactances are shown respectively by vectors 201 and 202 in FIG. 9, with the resultant impedance vector being capacitive in nature and being identified as vector 203. The resultant current represented by vector 204, will be capacitive in nature and will flow from point 164 through inductor 142′, capacitor 215, and back to the other plate of capacitor 214′. Such current will create a lagging voltage across capacitor 215, as represented by the vector 205 of FIG. 9, and a leading voltage across inductor 142′, as represented by vector 206 of FIG. 9.

From vector diagram 9, it can be seen that the resultant voltage across capacitor 215 of FIG. 8 is approximately 180° out of phase with the applied voltage $e_{c\text{-}214}$, represented by vector 200. Thus, between the points 164 and 165 there occurs a 180° phase shift.

Since bridging capacitor 150″ is bridged across three such stages, there will occur between the points 160 and 165 of FIG. 8, a total phase shift of 3×180°=360°+180°.

Figure 7:
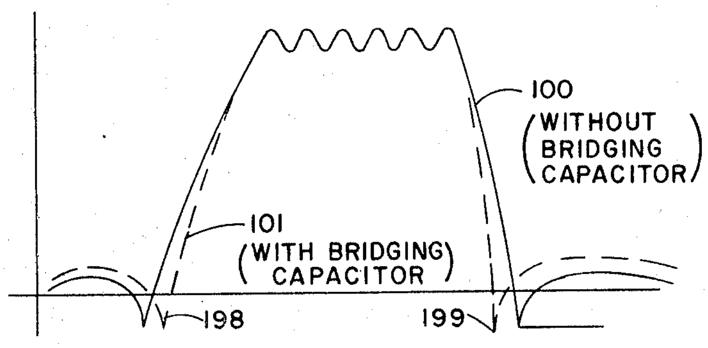
FIG. 7 shows a frequency response characteristic which illustrates the frequency response characteristic obtained with the use of the bridging capacitor of the present invention.

Having already established that the energy transferred through the bridging capacitor 150″ has substantially the same phase shift as the signal passing through the input capacitor $C''_{a2}$ to point 160, it can be seen that energy cancellation will take place at point 165. Thus at that point at the upper end of the passband where the energy flowing through the inductors 140′, 141′ and 142′ is attenuated to the point where it is equal to the energy transferred through the bridging capacitor 150″ an attenuation pole will occur. Such attenuation pole is shown at point 199 in the frequency response curve of FIG. 7.

In the case where the bridging capacitor bridges only one pair of electrodes, the total phase shift through the quartz crystal is two times 180° or 0°. More specifically, in FIG. 8 a bridging capacitor 151″ bridges only the pair of electrodes represented by the capacitor 214. The signal passing through the quartz crystal, i.e. through the inductors 141′ and 142′, undergoes two phase shifts of 180° each, so that the total phase shift between points 163 and 165 in FIG. 8 is 0°.

Since the circuit path from point 163 through capacitor $C''_{d2}$, bridging capacitor 151″, and capacitor 215 is entirely capacitive in nature, the voltages across each capacitive component will all be in phase with the supplied voltage from point 163. Therefore there will be no phase change in the voltage from point 163 to point 165, through the bridging capacitor 151″. Consequently, there will be no attenuation pole created at the upper end of the passband since the energy transferred through the bridging capacitor 151″ is in phase with the energy transferred through the main body of the filter, i.e. through the inductors 141′ and 142′.

Figures 10, 11:
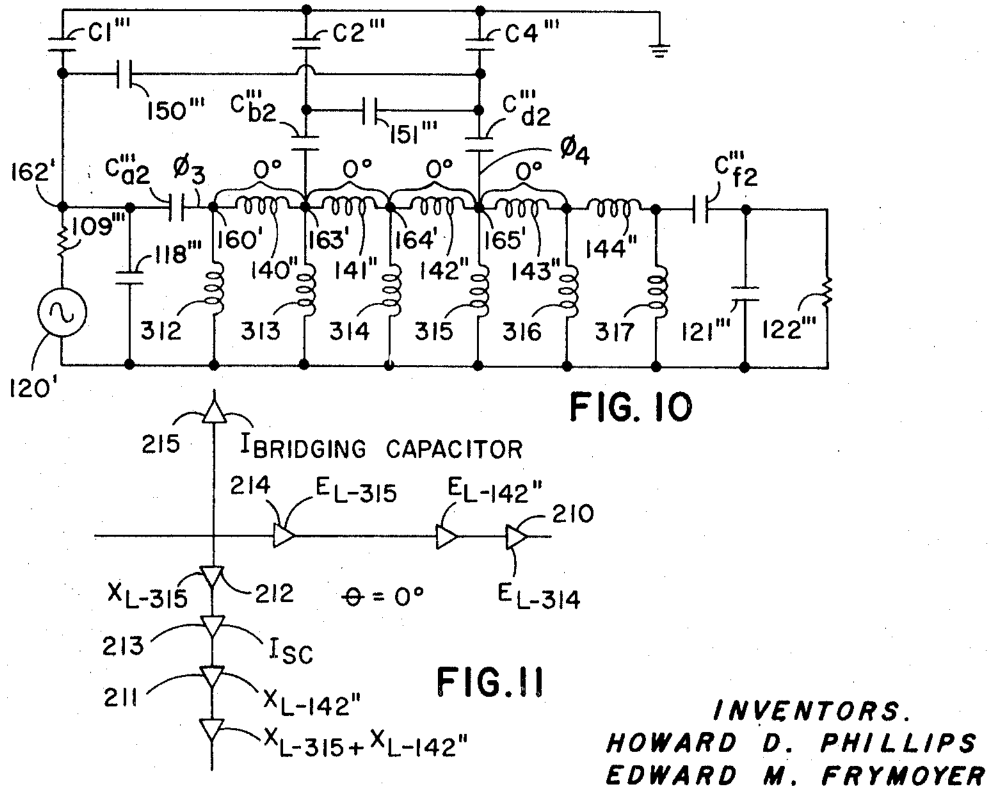
FIG. 10 is another diagram showing a portion of the equivalent circuit of FIG. 6 when the frequency of the input signal is near the lower limit of the passband and the tuned parallel circuits of FIG. 6 are essentially inductive in nature.
FIG. 11 is a vector diagram illustrating the operation of FIG. 10 and specifically shows how the energy through the bridging capacitor will cancel the energy passing through the crystal path of the filter at the lower end of the passband to provide an attenuation pole threat.

Referring now to FIG. 10 there is shown a portion of the circuit of FIG. 6 redrawn to reflect the condition when the frequency is at the lower end of the passband. Under such conditions circuits 112′ through 117′ of FIG. 6 are primarily inductive in nature, and in fact are represented solely by inductors 312 through 313 in FIG. 10.

Under these conditions the signal at point 162′ is supplied through the inherent capacitance $C'''_{a2}$ to a circuit which is almost completely inductive in nature. Since all of the components 140″–144″ and 312–317 are inductors, the phase shift between stages is 0°. Consider more specifically, the phase shift between points 164 and 165′. The voltage point at 164′ is represented by the vector 210 of the vector diagram of FIG. 11. This voltage (vector 210) is applied across inductors 142″ and 315, the impedances of which are respectively indicated by impedance vectors 211 and 212 in FIG. 11. The current through said inductors 142″ and 215 is represented by vector 213 of FIG. 11 and can be seen to lag the applied voltage $e_{L1314}$ by 90°.

The voltage generated by the current (vector 213) across inductor 315 in FIG. 10 is represented by vector 214 of FIG. 11; which vector can be seen to be in phase with the applied voltage $e_{L\text{-}314}$.

In a similar manner it is shown that the phase shifts between points 160' and 163' and the points 163' and 164', are also 0°.

Generalizing, it can be seen that the current supplied to the various inductors in the circuit of FIG. 10, such as inductors 142'' and 315, and the other inductors shown, lags the phase of the applied voltage at point 162' by about 90°. In point of fact, it is somewhat less than 90° due to the presence of capacitors $C'''_{a2}$. However, for purposes of this discussion, it can be assumed to be substantially 90°.

On the other hand, the current flowing from point 162' to the point 165' through the bridging capacitor 150''' leads the applied voltage at point 162' by 90° and is represented by the vector 215 in FIG. 11. Such current can be seen to be 180° out of phase with the current supplied to the point 165' through the inductors 140'', 141'' and 142''. Thus at the lower end of the filter passband when the attenuation through said inductors 140''–142'' has become sufficiently high, the energy transferred through the bridging capacitor 150'' will be equal to and substantially opposite in phase to, said attenuated signal, and substantially complete cancellation will occur, thus producing an attenuation pole at the lower end of the passband filter.

In a similar manner the energy passed through bridging capacitor 151''' and the two inherent capacitors $C'''_{b2}$ and $C'''_{a2}$ is advanced 90° from the voltage applied at point 162'. Said current through the bridging capacitor 151'' will again be represented generally by the vector 215 in FIG. 11. Thus the bridging capacitor 151''', which bridges one pair of electrodes, also functions to produce an attenuation pole at the lower end of the passband. Such attenuation pole is identified by the reference character 198 in FIG. 7.

It is to be understood that the forms of the invention shown hereinbefore are but preferred embodiments thereof and that various changes can be made therein without departing from the spirit or scope of the invention. For example, the number of pairs of electrodes can be decreased or increased depending upon the particular frequency response characteristic desired. Also more than two pairs of electrodes can be bridged to obtain desired attenuation poles either at the top edge of the passband, the lower edge of the passband, or both edges.

We claim:

1. A monolithic crystal filter means having "M" derived characteristics and comprising:
   - a crystal substrate;
   - a plurality of resonators formed on said crystal substrate with each resonator comprising a pair of electrodes formed on opposite sides of said substrate;
   - and means for supplying the input signal to be filtered across a first pair of said electrodes;
   - output means for detecting the signal generated across a second pair of electrodes;
   - first capacitor means connecting together a first electrode of each of a first pair of said resonators comprised of a third and a fourth pair of electrodes;
   - and at least one other resonator comprising a fifth pair of electrodes being positioned in between said third and fourth pairs of electrodes;
   - second capacitive means connecting a first electrode of said fifth pair of electrodes to a reference potential;
   - third capacitive means connecting together first electrodes of a second pair of said resonators;
   - said second pair of resonators being separated by at least one other resonator; and
   - fourth capacitive means connecting a first electrode of one of said second pair of resonators to a reference potential.

2. A monolithic crystal filter means in accordance with claim 3 in which:
   - the second electrode of said one of said second pair of resonators is connected to said reference potential.

3. A monolithic crystal filter means having "M" derived characteristics and comprising:
   - input means and output means;
   - crystal substrate means;
   - a plurality of resonators formed on said substrate with each resonator comprising first and second electrodes formed on opposite sides of said substrate;
   - said plurality of resonators positioned between said input means and said output means to provide a path for the signal to be filtered;
   - first capacitor means connected between a first electrode of a first of said resonators and a first electrode of a second of said resonators; and
   - second capacitor means connecting said first electrode of said first resonator to the second electrode of said first resonator; and
   - at least one resonator being positioned in between said first and second resonators.

4. A monolithic crystal filter means in accordance with claim 3 comprising:
   - third capacitive means connecting said first electrode of said second resonator to the second electrode of said second resonator.

5. A monolithic crystal filter means in accordance with claim 3 and further comprising:
   - third capacitive means connecting together first electrodes of a second pair of said resonators;
   - said second pair of resonators being separated by at least one other resonator; and
   - fourth capacitive means connecting a first electrode of one of said second pair of resonators to a reference potential.

6. A monolithic crystal filter means in accordance with claim 5 in which:
   - the second electrode of said one of said second pair of resonators is connected to said reference potential.

7. A monolithic crystal filter means having "M" derived characteristics and comprising:
   - input means and output means;
   - crystal substrate means;
   - a plurality of resonators formed on said substrate with each resonator comprising first and second electrodes formed on opposite sides of said substrate;
   - said plurality of resonators positioned on said substrate to form a path between said input means and said output means for the signal to be filtered;
   - first capacitive means connected between first electrodes of a first pair of said resonators;
   - said first pair of resonators being separated by at least one resonator;
   - second capacitive means connecting said first electrodes of said first pair of resonators to a reference potential;
   - third capacitive means connecting together first electrodes of a second pair of said resonators;
   - said second pair of resonators being separated by at least one other resonator; and
   - fourth capacitive means connecting the first electrodes of said second pair of resonators to a reference potential.

8. A monolithic filter means in accordance with claim 7 in which:
   - the second electrodes of said second pair of resonators are connected to said reference potential.

UNITED STATES PATENT OFFICE
CERTIFICATE OF CORRECTION

Patent No. 3,609,601 Dated September 28, 1971

Inventor(s) Howard D. Phillips et al.

It is certified that error appears in the above-identified patent and that said Letters Patent are hereby corrected as shown below:

Column 2, line 45, "threat" should read -- thereat --;
Column 6, line 70, "$e_{L1314}$" should read -- $e_{L-314}$ --.
Column 7, line 51, after "of" insert -- said --.

Signed and sealed this 12th day of September 1972.

(SEAL)
Attest:

EDWARD M.FLETCHER,JR.
Attesting Officer

ROBERT GOTTSCHALK
Commissioner of Patents